July 24, 1962 K. R. PETERSON 3,045,804
MATERIAL-HANDLING APPARATUS
Filed Aug. 10, 1959 2 Sheets-Sheet 1
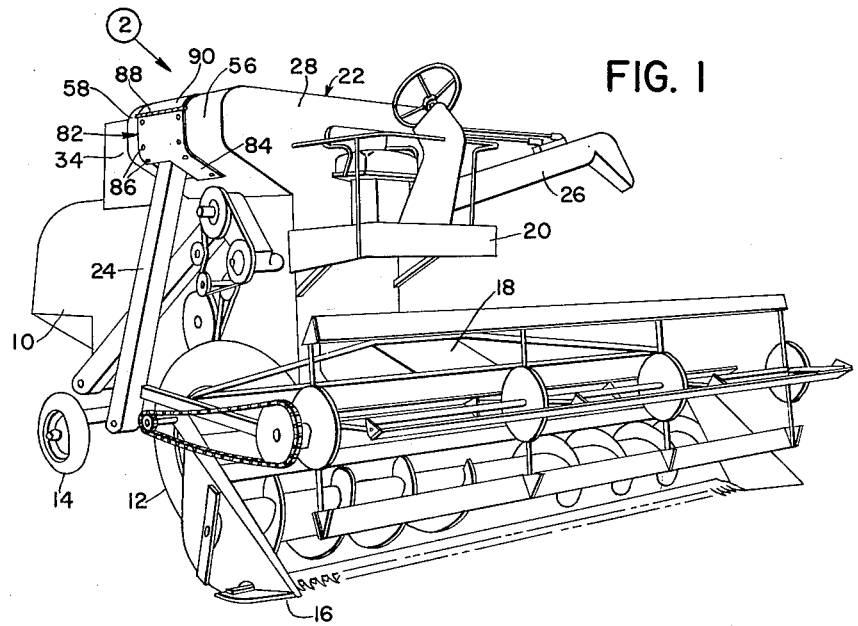
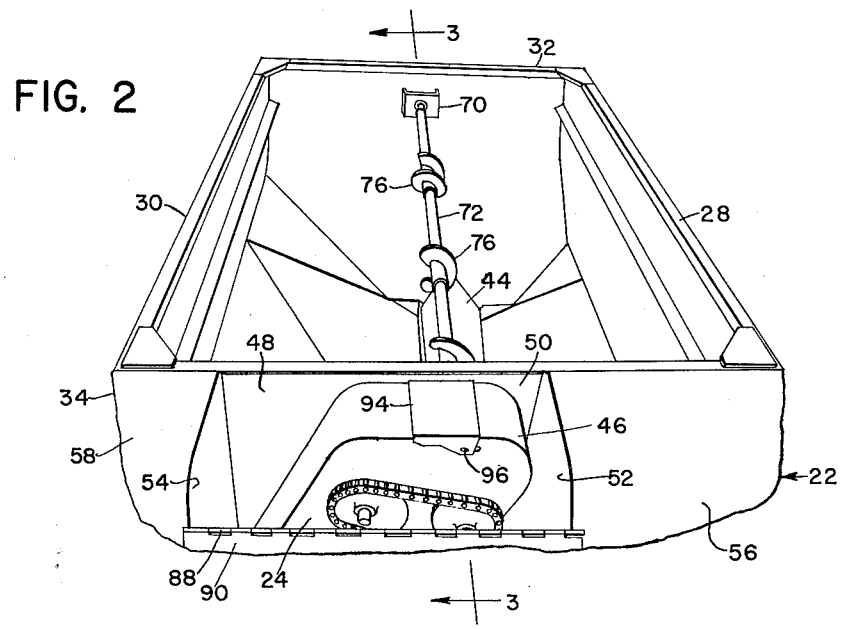
INVENTOR.
K. R. PETERSON July 24, 1962 — K. R. PETERSON — 3,045,804
MATERIAL-HANDLING APPARATUS
Filed Aug. 10, 1959 — 2 Sheets-Sheet 2

*INVENTOR.*
K.R. PETERSON

United States Patent Office 3,045,804
Patented July 24, 1962

3,045,804
MATERIAL-HANDLING APPARATUS
Kenneth R. Peterson, Moline, Ill., assignor to Deere & Company, Moline, Ill., a corporation of Delaware
Filed Aug. 10, 1959, Ser. No. 832,635
6 Claims. (Cl. 198—64)

This invention relates to the art of material handling and more particularly to a material-handling structure especially in the form of a grain tank and allied components adapted for use on a typical agricultural combine.

In the ordinary combine, the general arrangement includes a transverse front header which cuts grain and feeds it to the separator body for threshing thereof, after which the cleaned grain is delivered by a suitable elevator to a grain tank normally located above and at the forward end of the separator body. The tank is of sufficient capacity to hold quite a quantity of cleaned grain, and at appropriate intervals, a truck or other vehicle is driven alongside the combine and an unloading auger or suitable means is brought into operation to empty the tank into the truck.

In constructions heretofore known, the elevator or conveyor which brings the grain to the tank has normally entered the tank from above, which means that the height of the combine is augmented by the extent to which the delivery end of the cleaned grain conveyor projects above the top of the grain tank. According to the present invention, this arrangement has been redesigned so that the delivery end of the cleaned grain conveyor is below the level of the tank, thus giving the combine a lower silhouette. A further feature of the invention is to provide a design in which the upper or delivery end of the cleaned grain conveyor is accommodated in pocket structure afforded in one wall of the grain tank. Subsidiary features in this respect reside in the provision of novel panel or cover means, including a removable or hinged portion via which access may be had to the upper end of the conveyor, together with novel mounting means for the upper end of the conveyor. Further objects reside in the provision of a leveling auger in combination with the discharge or delivery auger from the conveyor to the interior of the grain tank, whereby the delivered grain is evenly distributed within the tank, thus increasing its efficiency and capacity. Another object is to provide a removable cover for access to the upper end of the grain conveyor when the tank structure cover is opened.

The foregoing and other important objects and desirable features inherent in and encompassed by the invention will become apparent as a preferred embodiment thereof is disclosed, by way of example, in the ensuing description and accompanying sheets of drawings, the several figures of which are described immediately below.

FIG. 1 is a perspective of a typical combine embodying the improved tank and elevator structure.

FIG. 2 is an enlarged fragmentary prespective as seen generally in the direction of the arrow bearing the encircled numeral 2 in FIG. 1.

Figure 3:
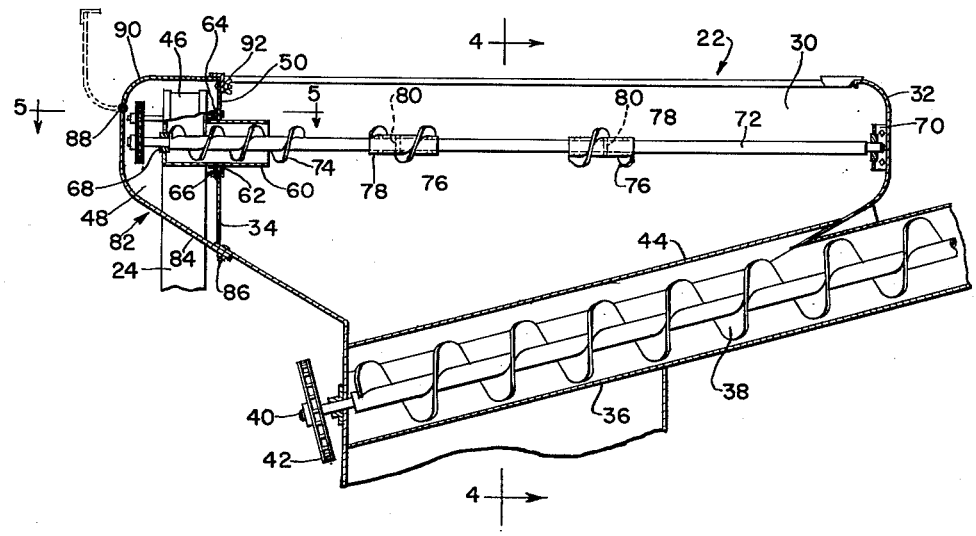
FIG. 3 is a transverse section as seen substantially along the line 3—3 of FIG. 2.
Figure 4:
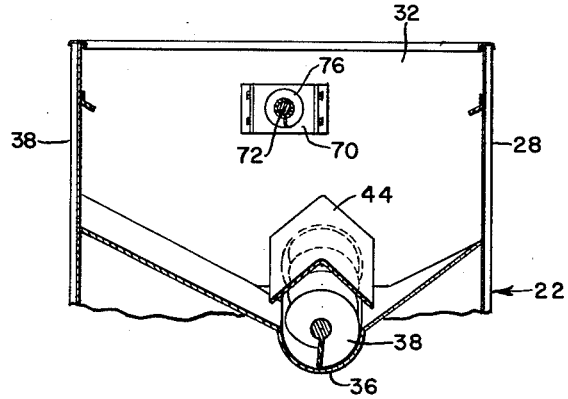
FIG. 4 is a section as seen along the line 4—4 of FIG. 3.
Figure 5:
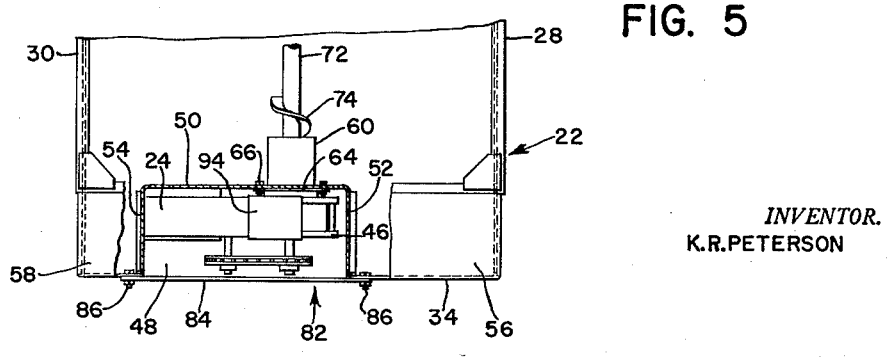
FIG. 5 is an elevation, partly in section, as seen along the line 5—5 of FIG. 3.

Those familiar with the general construction of combines will recognize such a combine in FIG. 1 as including a fore-and-aft main separator body 10 carried on front and rear wheels 12 and 14 and including a transverse header 16. A feeder house 18 extends rearwardly from the header to the front end of the body 10 for delivering cut gain to the threshing mechanism (not shown) within the body. An operator's station 20 is located at the upper forward portion of the body and rearwardly of this is a grain tank designated in its entirety by the numeral 22. In the normal threshing or combining operation, grain is threshed in the body 10, by the mechanism not shown here but which may be regarded as conventional, and the cleaned grain eventually reaches the tank 22 via a cleaned grain conveyor or elevator 24. The upper or discharge end of this conveyor leads into the tank 22 and when the tank has accumulated sufficient grain to require emptying thereof, an unloading auger 26 is utilized to deliver the grain to a truck or other vehicle.

The grain tank 22 may be regarded as a walled structure, here having front and rear walls 28 and 30, respectively, and opposite fore-and-aft side walls 32 and 34. The upper edges of the several walls are coplanar so that the tank has an open top. Bottom wall structure converges downwardly and inwardly to what may be regarded as a bottom trough 36 in which a helical conveyor 38 runs as an extension of the unloading auger 26. The details in this respect may be varied and accordingly do not in any way limit the present invention. The helical conveyor 38 has a projecting shaft 40 at one end thereof and this shaft carries a sheave 42 which may be driven in any suitable manner from a power source on the combine. The drive details are not shown, since they are relatively immaterial. Those versed in the art appreciate that a self-propelled combine normally has an internal combustion engine which furnishes power for the traction wheels 12 as well as for the several components of the machine, including the threshing mechanism and the various elevators and conveyors. A baffle or deflector in the form of an inverted V is shown at 44 for operation in conjunction with the auger 38. Here again, the details do not affect the arrangement involving the novel tank structure as respects the relationship thereof to the upper or discharge end 46 of the elevator or conveyor means 24. This relationship involves the provision in the tank wall 34 of what may be regarded as a pocket 48 formed by related wall portions of the wall 34. As will be seen, the pocket includes an intermediate laterally inwardly offset wall portion 50 and front and rear adjoining and laterally outwardly extending wall portions 52 and 54. Forward and rearward portions of the tank structure, respectively ahead of and behind the pocket 48, include curved sections 56 and 58, shaped as shown so that the tank is generally symmetrical at opposite sides of its fore-and-aft median plane. The pocket thus afforded opens upwardly and downwardly and also laterally outwardly and therefore accommodates or receives the upper end 46 of the conveyor means 24.

This conveyor means includes internally thereof any suitable material-moving means for moving grain upwardly to the end 46, which end represents an upper terminal end terminating below the level of the top edges of the tank, as best seen in FIG. 3. At this point, the upper end 46 includes discharge means, here in the form of a laterally inwardly projecting tube 60 which projects axially inwardly through an opening 62 formed in the offset wall portion 50. The tube is preferably provided with an annuuar flange 64 and removable securing means in the form of bolts 66 are utilized to secure the flange rigidly but removably to the offset wall portion 50.

The upper end 46 of the conveyor means 24 has therein what may be regarded as an outer bearing 68 disposed coaxially as respects the tube 60. The opposite wall 32 of the tank 22 has a bearing 70 which is coaxial with the bearing 68. These two bearings support opposite ends of a shaft 72. This shaft has at the end thereof within the tube 60 a delivery auger 74 for moving material from the upper terminal end 46 of the conveyor 24 into the interior of the tank structure. Additional helical flights or augers 76 are provided on the shaft 72 intermediate the ends thereof. These augers are provided for the purpose of leveling the grain within the tank, it being understood that while the tank is being filled, the unloading auger 26 is not in operation. The augers 76 each preferably include a central tubular shaft 78 pinned to the shaft 72 at 80, and each shaft 78 may have a plurality of holes so that the pin 80 may be removed and replaced in a different set of holes, whereby each auger 76 is axially adjustable on the shaft 72. The extent of the adjustment will of course depend upon the requirements of leveling performance as the tank is being filled.

From the description thus far it will be seen that the shaft 72 may be formed as a single elongated member and may be initially installed as part of the elevator 24. In view of the pocketed nature of the side wall 34, and further in view of the opening 62 in the offset wall portion 50, the elevator may be mounted on the tank by first inserting the shaft 72, complete with its augers 76 and 74, through the opening 62, the tube 60 fitting that opening and the flange 64 abutting the outer surface of the wall 50, after which the bolts 66 may be installed. The inner end of the shaft 72 will of course be received in the bearing 70. The outer end is already supported in the bearing 68 in the upper end 46 of the conveyor 24.

For the purpose of completing the mounting and enclosure of the upper end 46 of the conveyor 24, the pocket 48 is supplemented by what may be regarded as panel or closure means indicated in its entirety by the numeral 82. This means comprises a lower section 84 shaped as best shown in FIG. 1 and adapted to span the portions 56 and 58 of the wall means 34, a lower portion of the panel member 84 being cut out as shown to accommodate the portion of the conveyor 24 immediately below the upper terminal and 46 thereof. Removable fasteners at 86 are utilized to secure the panel members 84 in place. The upper end of the panel member 84 terminates in a fore-and-aft hinge 88 to which an upper panel member 90 is connected so that the upper panel member may be swung between open and closed positions as shown respectively in dotted and full lines in FIG. 3. When in its closed position, the panel is retained by releasable securing means as at 92.

The upper terminal end 46 of the conveyor 24 is provided with a cover 94 hinged at 96 for opening and closing so that access may be had to the interior of the upper end 46 when the panel means cover 90 is opened.

The overall arrangement is such that the height of the combine is materially reduced by the relationship between the delivery end of the conveyor 24 and the grain tank. The novel mounting means enables the accomplishment of ready assembly and disassembly, and the cover means 90 and 94 permit access to the interior of the related components for servicing and so forth. Features and advantages other than those categorically ennumerated herein will readily occur to those versed in the art, as will many modifications and alterations in the preferred embodiment of the invention disclosed, all of which may be achieved without departure from the spirit and scope of the invention.

What is claimed is:

1. In a harvester or the like having a main body including opposite sides: a grain tank disposed over said body and including opposite side walls and a bottom, one of said walls being laterally outwardy spaced from one side of the body and said bottom including a bottom wall joined to said one side wall and extending laterally inwardly toward said one side of the body, said bottom wall having an opening therein closely adjacent to said one side wall and laterally outwardly of said one side of the body, and said one side wall having an upper marginal edge at the top of the tank, and a conveyor extending upwardly alongside said one side of the body and through said opening, said conveyor having an upper terminal end disposed above said bottom wall and closely inwardly of said one side wall and said end being further so dimensioned as to be concealed by said one side wall from lateral view exteriorly of the tank, said end having discharge means leading to the interior of said tank.

2. The invention defined in claim 1, including: a laterally inwardly directed extension on said one side wall at its upper marginal edge and overlying said conveyor end to cover said end from above.

3. The invention defined in claim 2, in which: said extension is movable for exposing said end of the conveyor means.

4. The invention defined in claim 1, including: an additional upright wall portion rising from the bottom wall laterally inwardly of said opening and closely alongside said upper end of the conveyor and having an opening alined with said discharge means.

5. The invention defined in claim 4, in which: said upper end of the conveyor includes a shaft generally normal to said one side wall and projecting laterally inwardly from said discharge means and coaxially through said last-named opening, and sleeve means surrounds the shaft between said upper end of the conveyor and said additional wall portion.

6. A grain tank for harvesters and the like, comprising: a bottom and opposite upright side walls rising from said bottom, one of said side walls being shaped to provide a laterally outwardly and downwardly opening pocket and including generally coplanar portions respectively ahead of and behind said pocket and a portion laterally inwardly offset from the plane of said coplanar portions and said bottom having a notch in vertical register with the pocket, said offset portion having an opening therethrough leading to the interior of the tank; a conveyor extending upwardly into the pocket via said notch and having an upper terminal end within the pocket and including discharge means for delivering to the interior of the tank through said opening, said conveyor end being so laterally dimensioned as to lie inwardly of said plane; and closure means exteriorly of said conveyor end and spanning the pocket and lying generally in said plane to cover said conveyor end.

References Cited in the file of this patent

UNITED STATES PATENTS

| | | |
|---|---|---|
| 1,366,103 | Sturtevant | Jan. 18, 1921 |
| 1,433,754 | Stone | Oct. 31, 1922 |
| 2,321,838 | McBean | June 15, 1943 |
| 2,618,375 | Rahlson | Nov. 18, 1952 |
| 2,845,167 | Heiken | July 29, 1958 |

FOREIGN PATENTS

| | | |
|---|---|---|
| 1,060,173 | Germany | June 25, 1959 |
| 814,112 | France | Mar. 8, 1937 |